Jan. 12, 1932.　　A. G. RAYBURN　　1,840,877
PUMP AND CLUTCH MECHANISM
Filed Nov. 9, 1927　　5 Sheets-Sheet 2
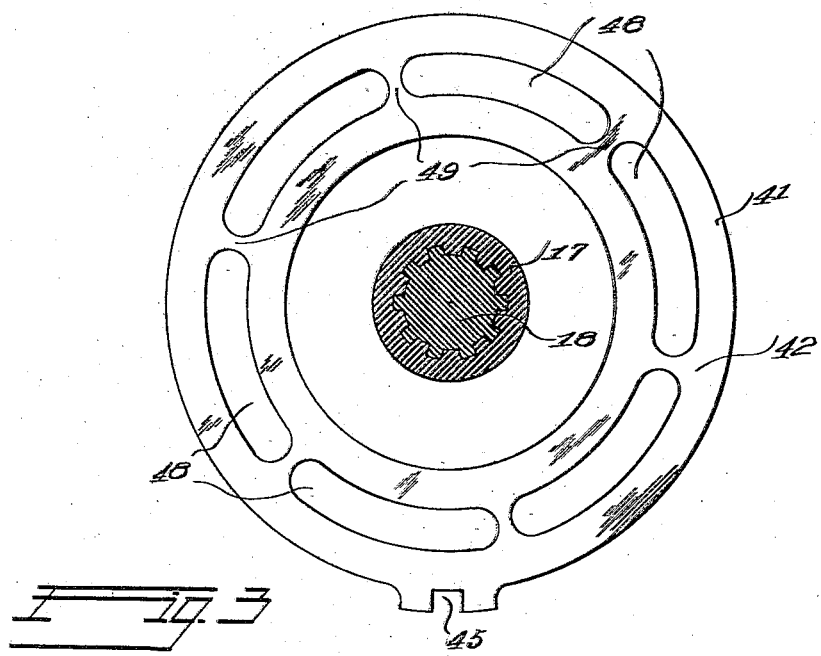
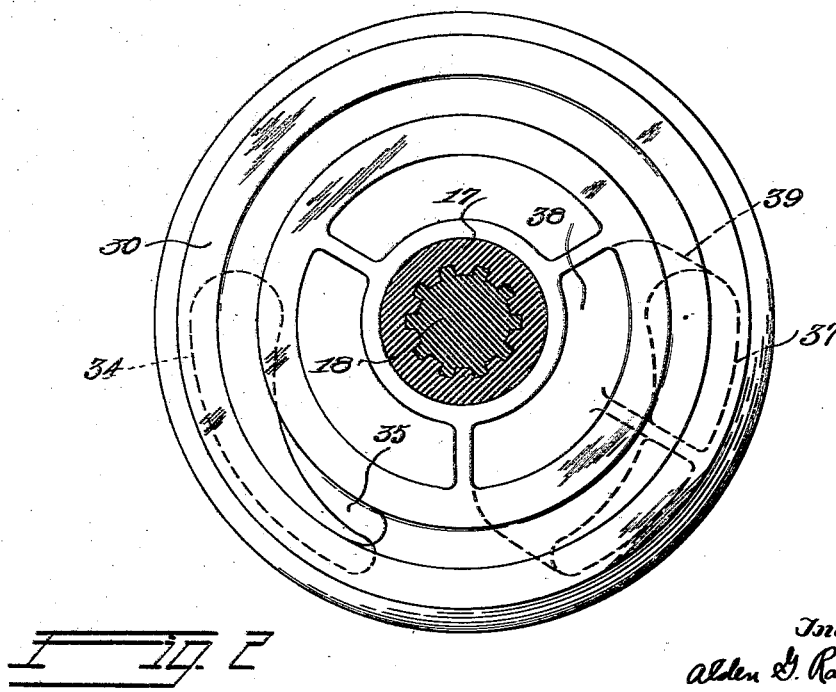

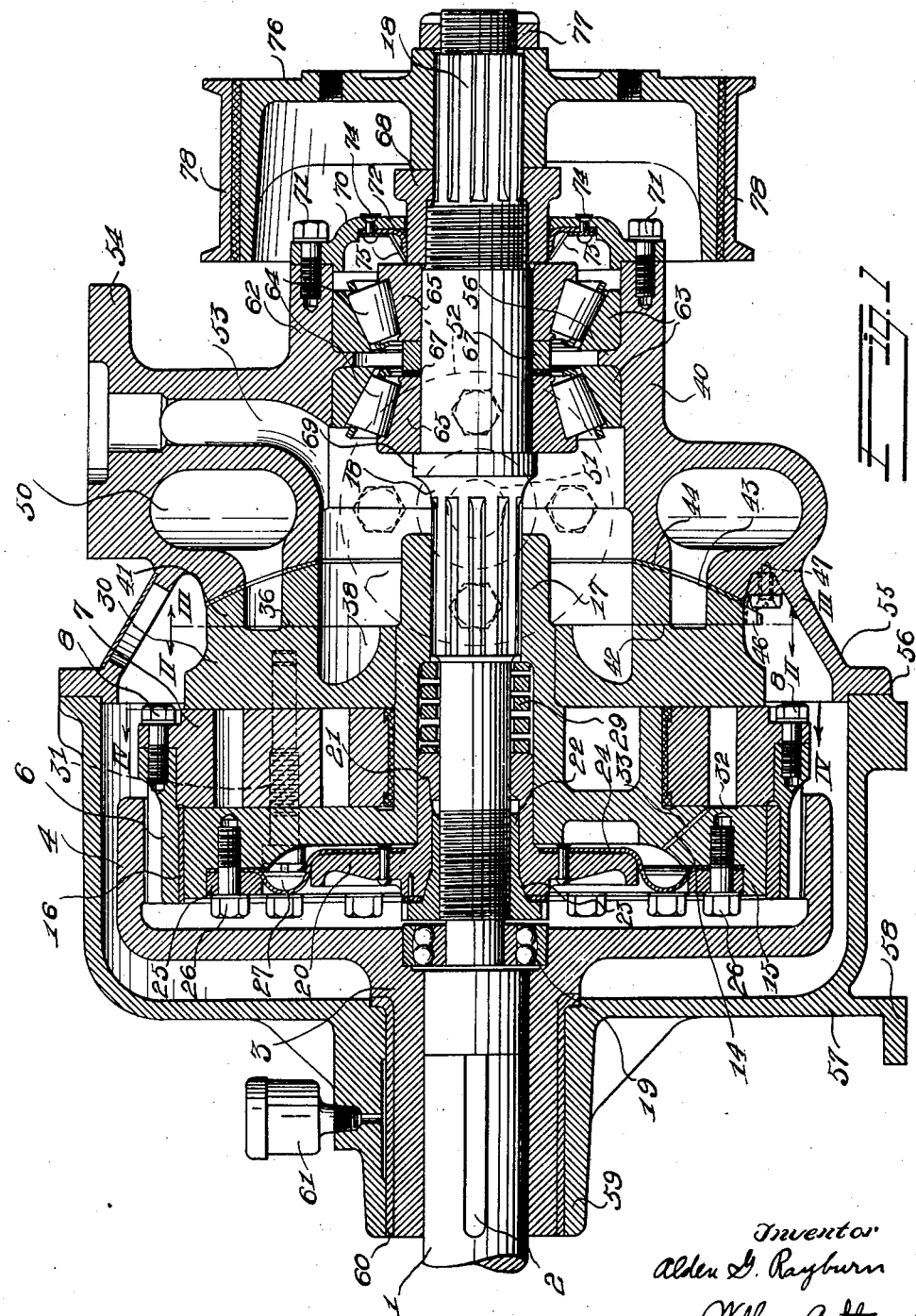

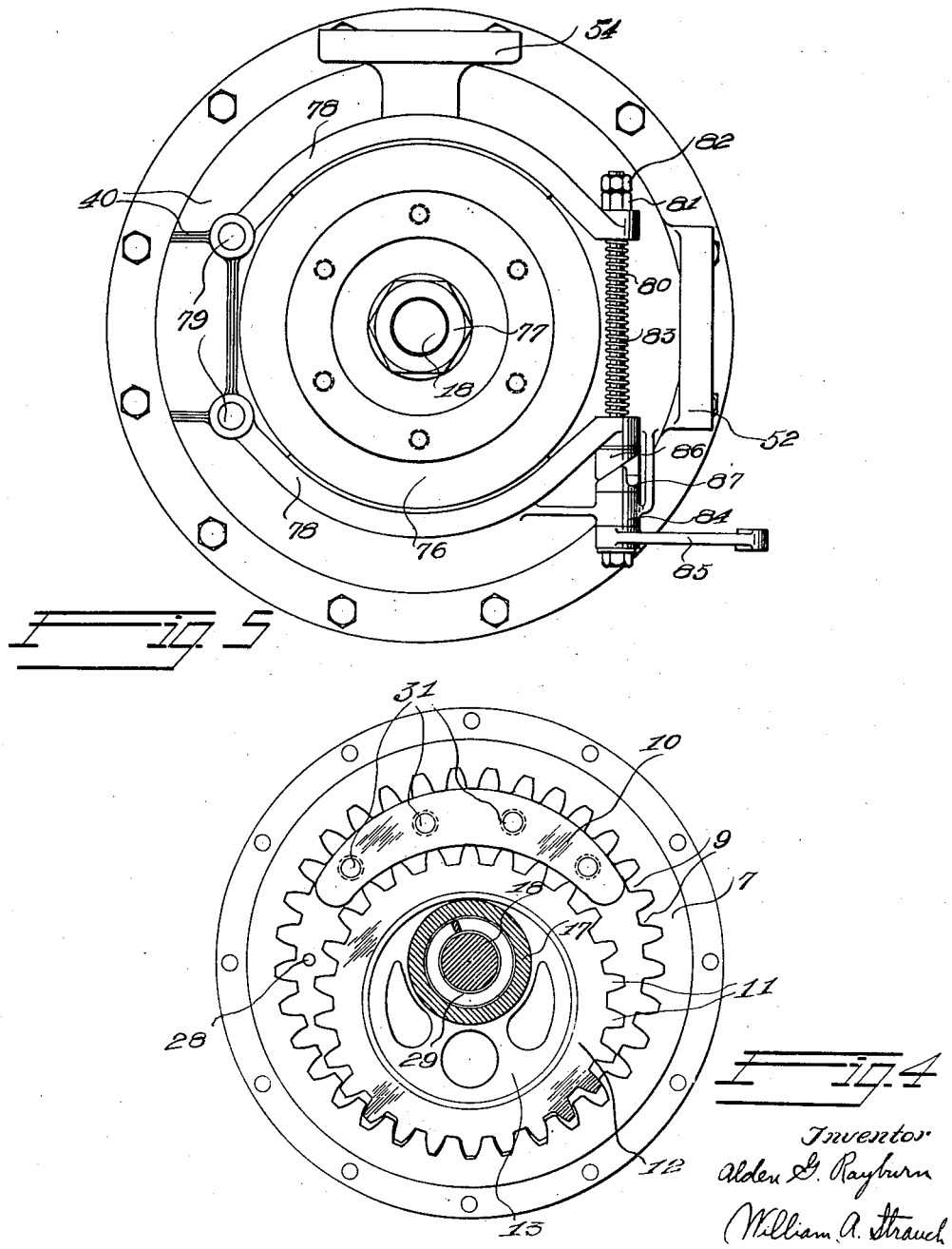

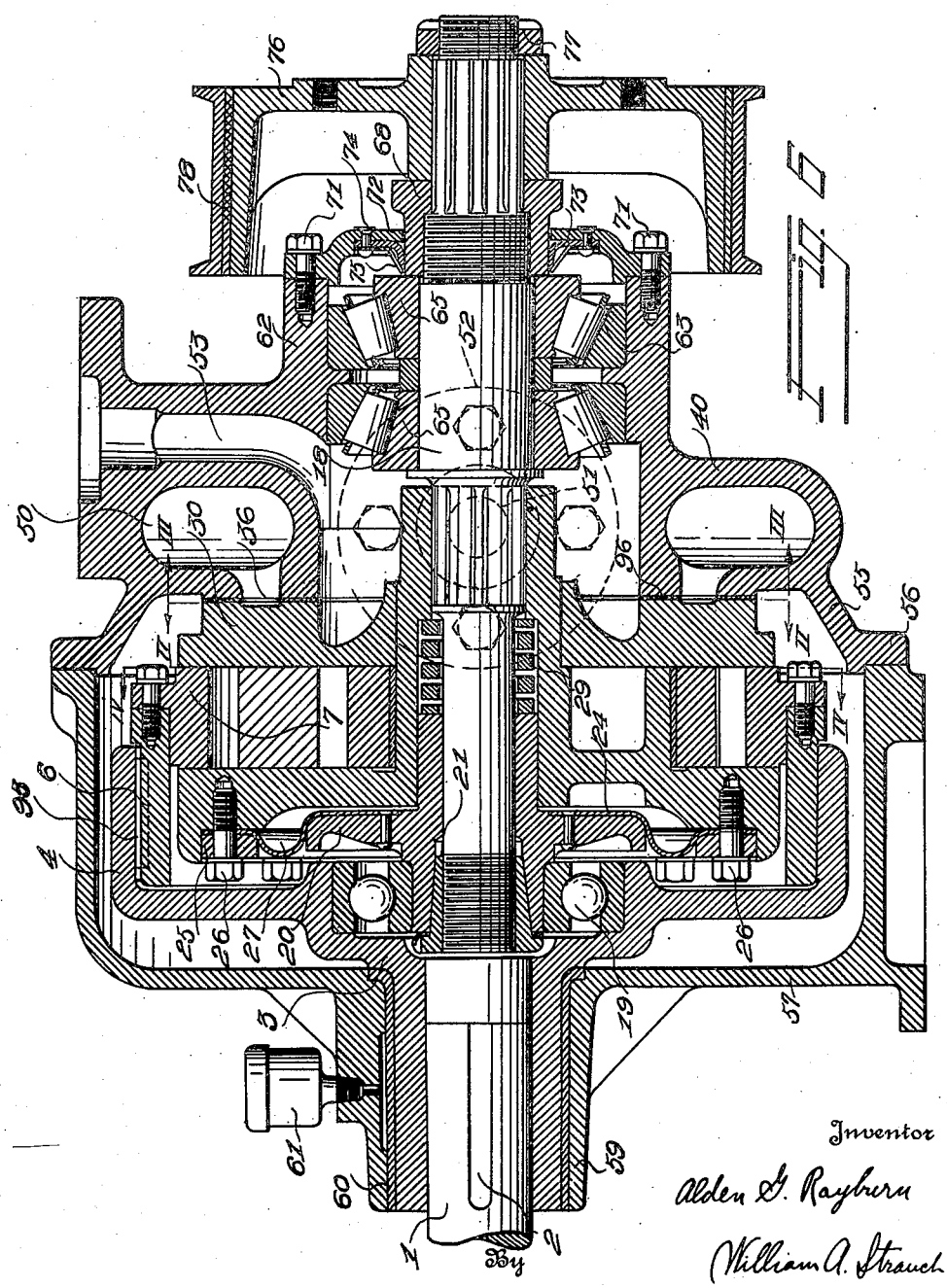

Jan. 12, 1932. A. G. RAYBURN 1,840,877
PUMP AND CLUTCH MECHANISM
Filed Nov. 9. 1927 5 Sheets-Sheet 5
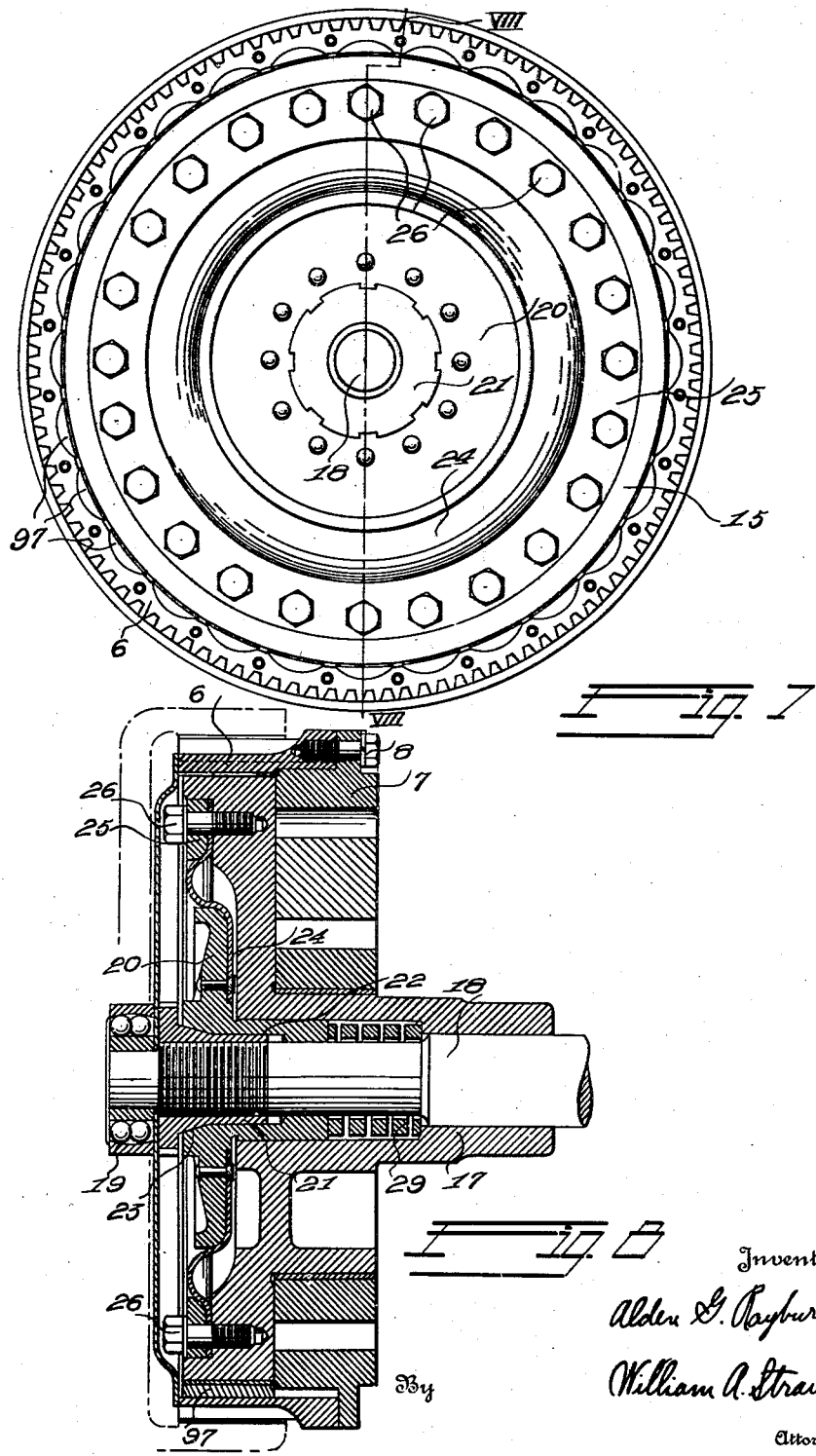

Patented Jan. 12, 1932

1,840,877

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

PUMP AND CLUTCH MECHANISM

Application filed November 9, 1927. Serial No. 232,082.

The present invention relates to pump constructions and clutch mechanisms and more particularly the invention relates to fluid pump and clutch constructions of the rotary type.

As heretofore proposed, rotary pumps have been subject to inherent difficulties due to expansion variations with temperature changes which have necessitated excessive clearance allowances in order to prevent binding and seizing of the rotating parts as they expand with increase of temperature. Furthermore the constructions have been such as to permit side wall deflections under pressure adding to the loss in efficiency due to excessive clearances. As a result, the efficiency of the prior proposed rotary pumps has been comparatively low and such prior devices have been restricted to comparatively low pressure operation.

A primary object of the invention is to provide simple, compact, and efficient rotary pump constructions in which a combined centrifugal and positive pumping action is secured, clearances to permit longitudinal expansion of the parts as the temperatures vary, are eliminated and in which side wall deflections are also substantially eliminated, whereby efficient pump mechanisms operable at higher efficiencies and operating pressures may be attained than have been heretofore feasible.

While various forms of variable capacity pumps have been heretofore proposed, such prior proposed constructions have been of complicated, expensive, and more or less impractical constructions lacking in durability and have been limited to comparatively small sizes.

A further object of the present invention is the provision of simplified, variable capacity pump constructions adapted for use in comparatively large sizes and for clutch constructions and in which the capacities may be readily varied while the mechanism is in operation.

Further objects of the invention are such as may be attained by a utilization of the various combinations and sub-combinations hereinafter set forth in the independent relations to which they are obviously applicable by those skilled in the art, and as are defined by the scope of the appended claims.

As shown in the drawings:—

Figure 1 is a longitudinal sectional view showing a preferred embodiment of my invention.

Figure 2 is a sectional view taken along line II—II of Figure 1.

Figure 3 is a sectional view taken along line III—III of Figure 1.

Figure 4 is a transverse sectional view taken aloong line IV—IV of Figure 1.

Figure 5 is a rear end view of the form of invention shown in Figure 1.

Figure 6 is a longitudinal vertical section of a modified form of the invention.

Figure 7 is a forward end view of a further modification of the invention.

Figure 8 is a sectional view taken along line VIII—VIII of Figure 7.

Referring to Figure 1, secured to shaft 1 of a suitable prime mover, and driven through key 2 is a drive member 3 with which driving extension 4 is integrally formed. Formed in drive extension 4 are internal series of driving teeth or splines which mesh with the teeth or splines of cylindrical pump ring gear supporting member 6 to which pump ring gear 7 is secured by means of cap screws 8. Gear 7 is provided with internal gear teeth 9 (Figure 4), the inner surfaces of which are adapted to rotate in fluid sealing engagement with the outer surface of sealing segment 10 and which mesh with the teeth 11 of a pump pinion 12 opposite the center of segment 10. The tops or outer surface of pinion teeth 11 are adapted to rotate in fluid sealing engagement past the inner surface of sealing segment 10. Pinion 12 is journaled on eccentric 13 which is formed or fastened integrally with the pump side wall member 14 (Figure 1). Formed on side wall member 14 is a suitable cylindrical pivot bearing section 15 on which the bearing surface 16 of cylindrical ring gear supporting member 6 is journaled for rotation. A central tubular driving quill section 17 is formed integrally with pump side wall member 14, the end of which is slidably splined to the control or driven shaft 18. Control shaft 18 at its forward end is slidably journaled in pilot bearing 19, the outer race of which is supported and secured in drive member 3. Supported on the end of shaft 18 is a diaphragm supporting member and reactance 20 provided with a cylindrical pilot extension 21 fitting slidably into a central bore formed in quill 17. Member 20 is held on shaft 18 and supported by the securing and supporting member 21 threaded on shaft 18 and provided with a supporting extension 22 having a tapered centering section 23 fitting into complemental supporting and centering bores formed in member 20 and serving to support and accurately center the outer end of member 20 on shaft 18. Secured to member 20 by riveting or in any other suitable manner is the inner edge of a flexible diaphragm 24 preferably of metal, the outer peripheral portion of which is secured in a suitable recess formed in pump side wall member 14 by means of a securing ring 25 and the securing cap screws 26. The diaphragm 24 and a recess in pump side wall member 14 are arranged to form a fluid chamber 27. In operation of the mechanism, fluid under pressure is admitted to chamber 27 continuously from the high pressure side of the pump through a small hole 28 (Figure 4) formed through the side wall 14. The fluid pressure in chamber 27 holds the pump side wall members together with gear 7, sealing segment 10, and pinion 12 in fluid sealing engagement with a predetermined pressure in operation of the device as will more fully hereinafter appear. Surrounding shaft 18 and interposed between the end of the tubular extension 21 of member 20 and the ends of splines formed in the end of quill 17 is a helical compression spring 29, normally under compression to force the quill 17 together with a pump side wall 14 to the right in Figure 1 with relation to shaft 18. Slidably keyed on quill 17 is a pump end wall and fluid distributing plate 30 against the inner surface of which sealing segment 10, and pinion 12 abut. Countersunk in and passing through side wall member 14 and threaded into suitable securing and guide holes formed in segment 10 are the supporting and aligning screw pins 31 (Figures 1 and 4) which secure segment 10 to side wall 14 and the ends of which extend into suitable supporting guide and aligning holes formed in plate 30. Formed in side wall 14 adjacent the point where teeth 9 and 11 of gear 7, and pinion 12 mesh is a relieved section 32 connected by a drilled hole 33 to the chamber 27 to permit small quantities of fluid trapped in the tooth depressions to pass into chamber 27 thereby relieving or eliminating hammer noises in the operation of the mechanism.

Formed in the forward face of member 30 is high pressure or outlet port 34 (Figure 2) which connects with the irregular shaped distributing port 35 also shown in broken lines in Figure 2 and formed in the timing face 36 (Figure 1) of the plate 30. A fluid inlet or suction port 37 formed in the forward face of plate 30 is connected with central annular fluid storage space 38 thru passage 39 (Figure 2).

Annular storage space 38 is formed centrally in a fluid receiving and storing casting 40 around quill 17 (Figure 1) and in an aligning member 41 (Figures 1 and 3) which is provided with a distributing face 42 contacting with the distributing face 36 of plate 30. Member 41 is provided with a convex spherical seating surface 43 which seats in a suitable complemental spherical surface 44 lined with bearing metal, formed in the casting 40. Member 41 is provided with a slot 45 (Figure 3) into which a projection of stop or locking member 46 (Figure 1) extends. Member 46 is secured to casting 40 by means of cap screws 47 and prevents rotation of the member 41 while at the same time permitting a limited universal aligning movement thereof.

Formed in the timing face 42 of member 41 and extending through the member 41 is an annular series of high pressure fluid ports 48 (Figure 3) separated by the strengthening ribs 49 forming a substantially 360 degree inlet passage to annular high pressure fluid storage chamber 50 (Figure 1) of casting 40. Communicating with high pressure fluid chamber 50 is a high pressure outlet connection 51 (Figure 1) which terminates in pipe flange 52 (Figures 1 and 5) of casting 40. Low pressure chamber 38 is connected by passage 53 to the supply pipe connection 54.

Casting 40 has formed integrally therewith the supporting casing section 55 which is provided with the securing and locating flange 56 secured to the supporting casing 57 by means of suitable securing studs. Casing 57 is provided with a suitable supporting base 58 and a bearing extension 59 in which a supporting sleeve 60 is rigidly secured, and drive member 3 is journaled for rotation. A suitable grease cup 61 is provided to lubricate bearing 60.

Mounted in tubular extension 62 of casting 40 are the outer races 63 of combined radial and thrust roller bearings 64, the inner races 65 of which are mounted on an enlarged section of and support control or driven shaft 18. Races 63 are spaced apart by the annular spacing and thrust member 56. Inner races 65 are spaced apart by the spacing ring 67 and shims 67' and are held in position on shaft 18 between the thrust collar 68 threaded on shaft 18, and shoulder 69 of shaft 18. Closing the end of tubular extension 62 is a cap member 70 held in position by machine screws 71. Thrust collar 68 extends thru a central opening in cap 70 and is engaged by annular packing member 72 held in position in a recessed section of cap 70 by securing member 73 and rivets 74. Packing member 72 is held in fluid sealing engagement with collar 68 by means of an annular series of closely spaced spring finger sections 75.

Splined to the end of shaft 18 is control drum 76 the hub of which abuts the end of thrust collar 68 and which is held in position on shaft 18 by means of securing nut 77. Engaging the periphery of drum 76 is a pair of friction shoe members 78. As shown in Figure 5, shoes 78 are pivotally supported at one end thereof on pivot pins 79. Pins 79 in turn are carried by an extension of casting 40. Extending thru suitable elongated holes formed in the opposite ends of shoes 78 is a rod 80, provided at its upper end with a nut 81 engaging the end of the upper shoe 78, and a nut 82 to lock nut 81 in position on the rod. Surrounding the rod 80 and interposed between the ends of shoes 78 is a compression spring 83 which normally forces the shoes 78 apart. Adjacent its lower end, rod 80 is journaled in a supporting bearing 84, and secured to the end of the rod protruding thru bearing 84 is an actuating arm 85 therefor. Fixedly secured to the lower shoe 78 is a wedging or cam member 86 provided with an inclined surface engaged by a complemental inclined wedging surface of cam member 87 which is secured to and rotatable with rod 80. By actuating arm 85, it will be seen that cam member 87 may be rotated with relation to cam member 86 to vary the pressure of shoes 78 on drum 76.

When the mechanism is utilized as a pump, the fluid supply line for the pump is connected to pipe connection 54 and the fluid discharge line is connected to pipe connection 52. When the mechanism is to be utilized as a hydraulic clutch, flanged connections 52 and 54, as will readily be understood, may be placed in series communication to interconnect the high and low pressure chambers 38 and 50 of the mechanism and thereby produce a neutral condition; or the connections 52 and 54 may be closed in any conventional manner to lock the fluid in the high pressure chamber 50, thereby causing the gear ring 7 and the pinion 12 to be hydraulically coupled to the driven shaft 18.

In the form of invention shown in Figure 6 the pilot bearing and the splined connection between the pump ring gear supporting member 6 and the drive member 4 is eliminated and pilot bearing 19 is enlarged to withstand the additional loads imposed thereon in this construction. Drive member 6 is provided with a smooth periphery, slidably mounted into a smooth bore formed in the drive member 4 and is keyed in position by means of a key member 95. In addition, in this form of the invention the aligning member 41 between the pump side wall and fluid distributing member 30 is eliminated being replaced by a flat surface 96 of casting 40 against which the face 36 of member 30 bears.

In the form of invention shown in Figures 7 and 8 the pilot bearing 15 shown in Figure 1 is modified for high speed operation, by providing in the inner periphery of drive member 6 a plurality of self aligning bearing shoes 97 faced with bearing metal surfaces and mounted in cylindrically surfaced seats formed around the inner periphery of driving member 6. The provision of the aligning shoes permits considerably higher surface speeds than with the form of pilot bearing arrangement shown in Figure 1.

In operation of the mechanisms so far described, for pumping purposes, with control shaft 18 stationary, and shaft 1 being driven, drive member 4, ring gear supporting member 6, and the ring gear 7 will be rotated. Rotation of ring gear 7 will rotate pinion 12 on eccentric 13. Eccentric 13 and sealing segment 10, and the pump side wall members 14 and 30 will remain stationary with shaft 18, and as the teeth 9 and 11 of ring gears 7 and 12 rotate past sealing segment 10, fluid will be drawn inward from the central chamber 38 out thru port 37 and carried in the spaces between the gear teeth then forced out thru the ports 34, 35 and 48, into the high pressure chamber 50 of casting 40. The fluid delivered into pressure chamber 50 passes outward thru discharge connection 51, and fluid is drawn inward thru the pump supply connection 54 and passage 53 to the central storage chamber 38. In this way a pumping action is set up.

As the pressures are built up in the mechanism fluid under pressure will be forced into chamber 27 thru the passage 28 and pressure will be exerted initially by the compression spring 29 plus the fluid pressures developed on the diaphragm 24 which will be transmitted thru the diaphragm supporting member 20, securing nut 21 to the shaft 18, thrust bearing assembly 64 to casting 40 and to supporting casing structure 57. At the same time the fluid pressures in chamber 27 will be transmitted thru the pump side wall member 14 to ring gear 7, pinion 12, sealing segment 10, plate 30 and aligning member 41 to the aligning seat 44 of casting 40, holding the pump parts in fluid sealing relationship with a pressure dependent upon the excess of the effective area of the chamber 27 over the internal pump areas under fluid pressure tending to separate the parts. The sizes of parts and areas are so proportioned that the parts are held in pumping relation with just sufficient overbalanced pressure to maintain a fluid sealing relationship without permitting any excessive bearing pressures to develop regardless of the pressures being delivered by the pump.

It will accordingly be seen that the pump parts are held in an assembled pumping relationship with predetermined pressure which will not vary substantially regardless of the variations of pressure developed.

When it is desired to vary the volumetric capacity of the pump per revolution of the driving shaft 1, lever 85 may be actuated to vary the frictional grip of shoes 78 on drum 76. As the grip of the shoes 78 on drum 76 is relieved, eccentric 13 together with pump side members 14 and 30, segment 10 and quill 17 will be driven at a speed controlled by the resistance of shoes 78 and drum 76 to rotation. As shaft 18 together with the eccentric 13 and related parts will rotate in the direction of rotation of ring gear 7 and shaft 1, the relative speed of rotation of ring gear 7 and pinion 12 with respect to each other, sealing segment 10 and fluid distributing member 30 will be decreased resulting in a decrease of the fluid pumped per revolution of shaft 1. By freeing the drum 76 completely from resistance of shoes 78, shafts 1 and 18 will rotate at the same speed and the pumping rotation of the ring gear and pinion will cease reducing the volumetric capacity of the pump to zero. It will accordingly be seen that by controlling the speed of rotation of shaft 18 thru friction shoes 78 and drum 76 the volumetric capacity of the pump may be varied from a minimum to maximum value while shaft 1 is rotating at a constant speed.

When the mechanism is to be operated as a clutch the shaft to be driven (for example the propeller shaft of an automobile or Diesel engine), may be coupled to drum 76 and the drum then serves as a brake drum for the driven shaft. Shaft 1 may be driven at full speed while the drum 76 and the driven shaft may be held against rotation by means of shoes 78 and drum 76. With the shaft 1 driven in this way and shaft 18 stationary, fluid may be circulated from the high pressure chamber 50 to low pressure chamber 38 by way of flanged connections 52 and 54. When it is desired to drive the driven shaft, arm 85 is actuated to relieve the pressure of shoes 78 on drum 76 and the flanged connections may be gradually closed to lock the fluid in the high pressure chamber 50. With the fluid locked in this way, relative rotation of gears 7 and 12 will be prevented, and the pump parts will be hydraulically coupled together, and the shaft 18 together with the connected parts will be coupled to and driven with shaft 1.

It will be apparent to those skilled in the art that pump and clutch mechanisms have been provided in which side wall deflections are substantially eliminated and the parts may be assembled without providing initial clearance, and temperature expansions of the parts may freely occur without binding. The elimination of the necessity for initial clearances has marked advantages in pumping constructions in that dirt and grit carried by the fluid being pumped is prevented from working between surfaces in the manner that occurs in pumping structure necessitating the use of substantial clearances.

It will furthermore be noted that owing to the fact that the fluid is withdrawn from central chamber 38 and forced into the surrounding annular chamber 50, the benefit of combined centrifugal and positive pumping action will be secured and a highly efficient mechanism is provided.

It is to be noted that the mechanisms are not limited to use with liquids and that the use of the constructions with gas motors such for example, as internal combustion motors contemplated as within the scope of the present invention, the principles of elimination of the necessity for initial clearances and elimination of side wall deflections permitting temperature expansion being applicable to a wide range of uses not specifically described as will be obvious to those skilled in the art.

Accordingly, having described preferred embodiments only of my invention, what is desired to be secured by Letters Patent and claimed as new is:—

1. A variable pump mechanism comprising a pair of side walls, meshing pump gears disposed between said side walls, means for driving one of said gears to effect pumping operation; and means for varying the relative rate of rotation of said gears to vary the volumetric capacity of said pump independently of the speed of said driving means.

2. In a pump mechanism, a sub-combination comprising a pair of side walls, a pair of meshing pump gears between said side walls, a reactance member and means actuated by fluid pressures developed by said pump gears for holding said side walls in fluid sealing relationship with respect to said gears, said means including a flexible diaphragm having its periphery sealed against one of said walls and its central portion secured to said reactance member.

3. The combination as set forth in claim 2 in which said last mentioned means forms a chamber in permanent communication with the high pressure side of said pump mechanism by way of a passage through one of said walls.

4. In a pump the sub-combination of a pump ring gear, driving means for said ring gear; a pump pinion meshing with said ring gear; and an eccentric upon which said pinion is journaled for rotation, said eccentric being designed to rotate during pumping operation in response to rotation of said ring gear.

5. The sub-combination as set forth in claim 4, together with a sealing segment rotatable in unison with said eccentric, and means for controlling the rate of rotation of said eccentric and segment to vary the effective rotation of said ring gear and pinion independently of the speed of operation of said driving means.

6. A pump mechanism comprising stationary low and high pressure fluid chambers, a rotatable pump side wall and a fluid distributing member having low and high pressure ports in continuous communication with said low and high pressure fluid chambers; a second rotatable pump side wall; an eccentric rotatable with said side walls, a pinion journaled on said eccentric; a ring gear disposed between said side wall members meshing with and driving said pinion; and means for driving said ring gear.

7. The combinaion as set forth in claim 6 together with means independent of said driving means for varying the rotation of said pump side walls and said eccentric to vary the volumetric capacity of said pumping mechanism.

8. In a pump the sub-combination of a pair of rotatable side wall members, an eccentric rotatable with said side wall members, a pinion rotatable on said eccentric; a ring gear meshing with said pinion; sealing means between said gears; and driving means for the ring gear.

9. In devices of the character described, a stationary housing, a shaft rotatably supported in said housing, a low pressure fluid storage space disposed centrally within said housing, and a pump mounted upon said shaft, said pump including coacting pumping elements and a fluid distributing member between said elements and said low pressure storage space, said distributing member being rotatable and provided with an inclined passage whereby low pressure fluid may be fed from said storage space to said pumping elements by centrifugal action.

10. In a pump, a stationary housing provided with low and high pressure fluid chambers; a driving member journaled in said housing; a pump side wall member journaled in said driving member, means adjacent said wall to form therewith an operating chamber, and elements within said operating chamber, driven by said driving member to withdraw fluid from said low pressure chamber and to deliver it to said high pressure chamber.

11. The combination as set forth in claim 10 in which the fluid is withdrawn from said low pressure chamber substantially centrally and discharged into said high pressure chamber outside of the point of withdrawal of fluid from said low pressure fluid chamber.

12. The combination as set forth in claim 10 in which said pump side wall member is supported in said driving member by means of a plurality of bearings.

13. The combination as set forth in claim 10 in which said side wall member is supported in a bearing comprising a plurality of self-aligning shoes.

14. A pump mechanism comprising a stationary housing having high and low pressure fluid chambers formed therein, a plurality of rotatable pump side walls mounted in said housing; a pump ring gear and pinion mounted between said pump side walls; driving means for said pump ring gear; an aligning member interposed between said pump side walls and the chambered portion of said housing; and fluid pressure operated means for holding the parts in fluid sealing relationship with respect to each other and with respect to said housing.

15. In devices of the character described, a rotary pump mechanism comprising a pair of side walls, coacting pumping elements disposed between said side walls and means for driving one of said elements, and means for varying the relative rate of rotation of said pumping elements to vary the volumetric capacity of said pump without changing the speed of said driving means.

16. In the apparatus defined in claim 15, said side walls being rotatable and said varying means comprising a device for varying the rotational speed of said side walls.

17. In a device of the character described, a stationary housing having high and low pressure fluid chambers formed therein, a shaft mounted within said housing, a rotary pump mechanism mounted upon said shaft in longitudinally movable relation thereto, an aligning member interposed between one side of said pump and the chambered portion of said housing to permit a limited universal movement of the former with respect to the latter, and fluid pressure operated means for thrusting the pump toward said aligning member to maintain the parts in fluid sealing relationship.

18. In devices of the character described, the sub-combination of a rotatable shaft, a reactance member immovably mounted against longitudinal displacement in at least one direction with respect to said shaft, a rotatable member mounted upon said shaft and having a face adjacent said reactance member, and means connecting said reactance member with said rotatable member to form a radially arranged fluid chamber between the former and said face of the latter, whereby during rotation the fluid in said chamber is thrown outwardly by centrifugal force to cause said rotatable member to be thrust away from said reactance member.

19. A rotary fluid pump comprising a side wall provided with an integral axial extension, a second side wall spaced from the first mentioned side wall and slidably mounted axially upon said extension, fluid pumping elements disposed between said spaced side walls, and means for driving one of said elements.

In testimony whereof I affix my signature.

ALDEN G. RAYBURN.